Patented May 10, 1932

1,858,151

UNITED STATES PATENT OFFICE

ADOLF GORHAN, OF LIESING, NEAR VIENNA, AUSTRIA, ASSIGNOR, BY MESNE ASSIGNMENTS, TO FIRM OF DEUTSCHE GOLD- UND SILBER-SCHEIDEANSTALT VORMALS ROESSLER, OF FRANKFORT-ON-THE-MAIN, GERMANY, A CORPORATION OF GERMANY

PROCESS FOR CONCENTRATING VOLATILE ALIPHATIC ACIDS

No Drawing. Application filed May 24, 1928, Serial No. 280,394, and in Germany June 2, 1927.

The invention relates to the conversion of dilute volatile aliphatic acids, particularly dilute acetic acid into concentrated form.

It is already well known to produce concentrated acetic acid from dilute acetic acid by introducing potassium acetate in a large excess into the dilute acetic acid and subjecting the double salt thus formed, which separates in the cold after separation from the solution, to distillation.

It has now been found that by means of salts which, as for example potassium acetate, are capable of forming with the acid to be concentrated double salts in solid form which can be separated, the acid in question can also be extracted from organic solvents with excellent results. It is thus possible to obtain acids, which are dissolved in organic solvents, as occur in industry, in a simple manner in concentrated form.

This procedure at the same time also permits of concentrating dilute acids particularly also acetic acid with excellent commercial and economical results.

The invention may for example be carried into effect by treating the dilute acid, for example dilute acetic acid, with solvents which, on the one hand, are capable of absorbing large quantities of the acid and which, on the other hand, can be readily separated from water. As suitable solvents may be mentioned for example acetone or wood spirit oils, ether, butyl alcohols and so forth.

If desired the suitability of the solvents for the purpose in view may be improved by the addition thereto of additional substances. Thus for example an addition of benzol to acetone oils or butyl alcohol has been found very satisfactory as by these means both the solubility, for example of the acetone oils, in water and of water in the acetone oils has been considerably reduced and in addition the separation of the two liquids by reason of the greater difference in their specific gravities can be effected more quickly.

When mixing equal parts of acetone oils and dilute acetic acid the distribution of the acetic acid in the water and the organic solvent is about 1:1. When operating on the counter-current principle it is possible to extract almost all the acid from the wateracid mixture. The operation for example is such that the dilute acetic acid is passed from the top through a suitable apparatus, for example a tower, whilst the organic solvent is introduced into the tower at the bottom and is conducted in as effective a distribution as possible through the dilute liquid, for example in such a manner that it rises through this in the form of numerous small beads. In the upper portion of the column there then collects the organic solvent containing the acetic acid, whilst the water flows out at the bottom.

From the solution of acid in the organic solvent which is obtained the acid may be extracted in a simple manner by treatment with potassium acetate, for example in such a manner that the solution is brought into contact, preferably on the counter-current principle, with a concentrated potassium acetate solution in a second extraction tower. This for example is effected in such a manner that the potassium acetate solution is introduced into the top of the tower and the solution of acid in the organic solvent is introduced at the bottom and the potassium acetate solution is introduced under conditions under which intimate contact takes place. The process may be carried out at ordinary temperature or at moderately increased temperature for example at a temperature of about 30 to about 40° C. The organic solvent then leaves the upper portion of the tower whilst the acetate solution passes out from the lower portion thereof. The double salt which is formed can be extracted from the acetate solution by cooling. The separation is preferably promoted by agitation, for example in such a manner that the solution is allowed to flow into cooled jigging troughs. After separation of the double salt from the solution the acid may be extracted for example by distillation from the acid acetate, which if desired may previously be dried for example by treatment with hot air.

During this operation deleterious temperatures, for example 300° C. and more, are to be avoided as these are liable to lead to undesirable auxiliary reactions such as for example the formation of acetone. The distillation may for example be carried out at temperatures of about 200° C., with or without a vacuum. The remaining acetate, as also the acetate solution may be returned to the operation. Instead of treating the double salt formed, for example acid potassium acetate, by decomposition for obtaining concentrated free acid, the salt may be used alone or may be otherwise treated, for example for the production of other salts, of esters and the like.

Instead of potassium acetate it is also possible to use other suitable salts, for example acetates of the other alkalies or of the alkaline earths, if desired also mixtures of such salts. The salts or salt mixtures may be used for example in the form of concentrated solutions or also in solid form. In the latter case somewhat higher temperatures are preferably used and the salt is thoroughly mixed with the solution to be treated.

The process is suitable for the concentration of dilute acids, for example acetic acid, of varied concentrations, for example fermenting vinegar, waste acetic acids, for example as occur as waste from the manufacture of acetyl cellulose and any other industries.

It is also applicable to the concentration of raw pyroligneous acid. When treating this initial substance, which if desired may be subjected to a preliminary tar removing process, it has been found that a portion of the empyreumatic constituents which are present pass into the organic solution, but that they do not pass into the potassium acetate solutions. Any formic acid which may be present does not crystallize.

The process has the advantage that it can be carried out without the consumption of heat or with an extremely low, practically unimportant consumption of heat.

It has also been found that in many cases it is not necessary to first isolate the double salt formed as such, but that frequently it is of advantage to directly treat it further in the form in which it is obtained, therefore for example in the form of paste or in the form of a concentrated solution thereof, for example in such a manner that it is heated to temperatures at which the concentrated acid distils therefrom. This method of operation has been found particularly advantageous for example when using the sodium salt of acetic acid or salt mixtures containing the sodium salt.

Thus for example the double salt of acetic acid obtained in concentrated solution or in the form of paste produces this acid in concentrated form when heated to about 170 to 200° C. When using a vacuum the acetic acid is driven off completely at about 220° C. Amongst others this method of operation has the advantage of a considerable simplification of the apparatus, as cooling devices, centrifuges and other apparatus otherwise necessary for the separation of the crystallized salts are omitted. It is also suitable for example for the treatment of raw pyroligneous acid as the tar present in the salt which is obtained is rendered almost insoluble by heating to from 200 to 220° C. and can easily be removed. The losses in organic solvents are also reduced as all the operations can be carried out in closed vessels. In spite of the omission of crystallization the process produces an acid of excellent purity as the first running impurities and a large portion of the subsequent runnings can be collected separately when distilling the concentrated acetic acid and this itself need only be separated if desired by a second distillation from substances having a higher boiling point.

In the following claims the reference to salt or salt mixture is intended to cover the salts and salt mixtures both in solid or dry form or in the form of their preferably concentrated solution or even in the form of paste.

I claim:—

1. A process for converting dilute acetic acid into concentrated form, consisting in removing the acids from solutions of the acids in organic solvents by means of salts, said salts being capable of forming with the acid in question double salts.

2. A process for converting dilute volatile aliphatic acids into concentrated form, consisting in heating dilute solutions of volatile aliphatic acids with organic solvents which are capable of dissolving the acid and of being readily separated from water, and then extracting the acids in the form of double salts from the organic solvents by treatment thereof with salts which are capable of forming with the acid in question double salts.

3. A process for converting dilute acetic acid into concentrated form, consisting in extracting acetic acid from dilute acetic acid by means of organic solvents, and treating the solution of acetic acid in organic solvents with acetates which are capable of forming double salts with the acetic acid.

4. A process for converting dilute volatile aliphatic acids into concentrated form, consisting in extracting the acids in the form of double salts from solutions of the acids in organic solvents, and decomposing the double salts by heating to recover the concentrated acids.

5. A process for converting dilute volatile aliphatic acids into concentrated form, consisting in extracting the acids in the form of double salts from solutions of the acids in organic solvents, and heating the double salts, without separating off the accumulated aqueous solution, to temperatures at which the acid distills off in concentrated form.

6. A process for converting dilute volatile aliphatic acids into concentrated form, consisting in extracting the acids in the form of double salts from solutions of the acids in organic solvents, on the counter-current principle, by means of concentrated solutions of salts which are capable of forming with the acid in question double salts.

7. A process for converting dilute volatile aliphatic acids into concentrated form, consisting in extracting the acids in the form of double salts from solutions of the acids in organic solvents, by means of alkali metal salts which are capable of forming with the acid in question double salts.

8. A process for converting dilute volatile aliphatic acids into concentrated form, consisting in extracting the acids in the form of double salts from concentrated solutions of the acids in organic solvents, by means of salt mixtures capable of forming with the acid in question double salts.

9. A process according to claim 1 wherein the salts used for removing the acids from solutions of the acids in organic solvents are in concentrated aqueous solution.

10. A process for converting dilute volatile aliphatic acids into concentrated form, consisting in treating solutions of the acids in organic solvents with concentrated aqueous solutions of salts which are capable of forming with the acid in question double salts, and then heating the aqueous solution of the resulting double salts, after separating off the organic solvent, to temperatures at which the acid distills off in concentrated form.

In testimony whereof I affix my signature.

Dr. ADOLF GORHAN.